United States Patent
Straschewski

(10) Patent No.: US 6,279,980 B1
(45) Date of Patent: Aug. 28, 2001

(54) INTEGRATED PICK-UP TRUCK BED EXTENDER

(76) Inventor: Mark Straschewski, 257 S. Berkshire, Bloomfield Hills, MI (US) 48302

( * ) Notice: Subject to any disclaimer, the term of this patent is extended or adjusted under 35 U.S.C. 154(b) by 0 days.

(21) Appl. No.: 09/520,457

(22) Filed: Mar. 8, 2000

(51) Int. Cl.7 .................................................. B62D 35/00
(52) U.S. Cl. ............................ 296/57.1; 296/26.11
(58) Field of Search ............................. 296/26.11, 57.1

(56) References Cited

U.S. PATENT DOCUMENTS 4,884,838 * 12/1989 Slater ........................... 296/26.11 X
5,169,201 * 12/1992 Gower ........................... 296/57.1 X
5,857,724 * 12/1999 Jarman ........................... 296/26.11
5,918,925 * 7/1999 Perrin ........................... 296/26.11

* cited by examiner

Primary Examiner—Joseph D. Pape
(74) Attorney, Agent, or Firm—John R. Benefiel

(57) ABSTRACT

A cargo bed extender for a pick-up truck is installed by use of a replacement edge guard having hinge features interfit with hinging features on a rear panel of the extender to hinge mount the rear panel to the upper edge of the tailgate. A pair of side panels are each hinged to respective side of the rear panel, and are swung to the side when the extender is deployed.

1 Claim, 3 Drawing Sheets

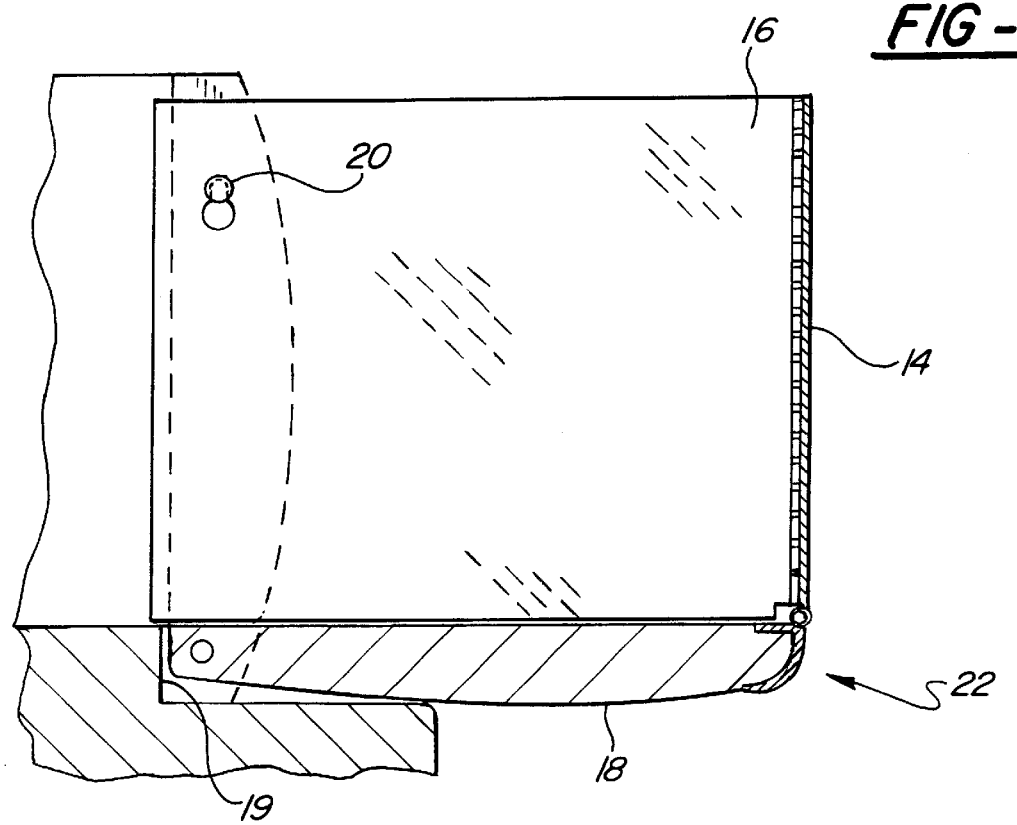
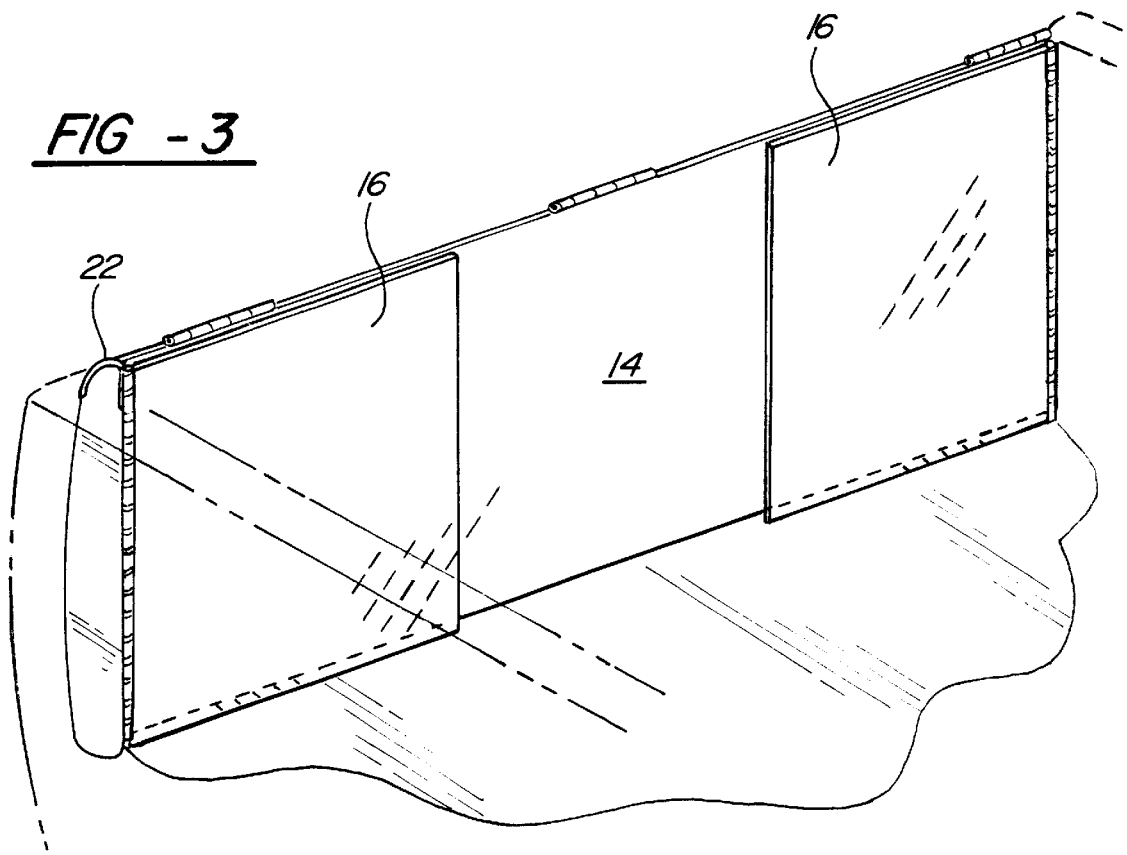

INTEGRATED PICK-UP TRUCK BED EXTENDER

BACKGROUND OF THE INVENTION

This invention concerns extenders for the bed of pick-up trucks of the type including a rear panel hinged to the top of a pick-up tail gate, and a pair of side panels each hinged to an opposite side of the rear panel. When the tail gate is lowered, the rear panel is raised up and side panels swung out to close the gap on either side, providing a longer cargo space.

Such extenders have been described in a number of prior U.S. patents, from U.S. Pat. No. 2,872,239 to U.S. Pat. No. 6,019,410.

Such extenders have been designed as after market devices, with the rear panel hinge screwed or bolted to the tailgate.

Such an installation creates an unfinished utilitarian appearance, requires some effort to install, and the screw fasteners penetrating the body sheet metal lessens resistance to rust out. Some OEM's void the rust out warranty if such fasteners are used.

It is the object of the present invention to provide a cargo bed extender of the type described which is easier to install and presents an integrated more finished appearance, and does not compromise the rust resistance of the body sheet metal.

SUMMARY OF THE INVENTION

The above object and others which will become apparent upon a reading of the following specification and claims is accomplished by providing a replacement trim piece for the top of the tailgate as one portion of the back panel hinge with the back panel having the mating hinge portions.

The back panel is then simply assembled to the replacement trim piece, to install the bed extender on the pick-up.

DESCRIPTION OF THE DRAWINGS

FIG. 2 is a transverse sectional view taken through the deployed extender of FIG. 1.

FIG. 3 is an inside perspective view of the extender in the stowed condition.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
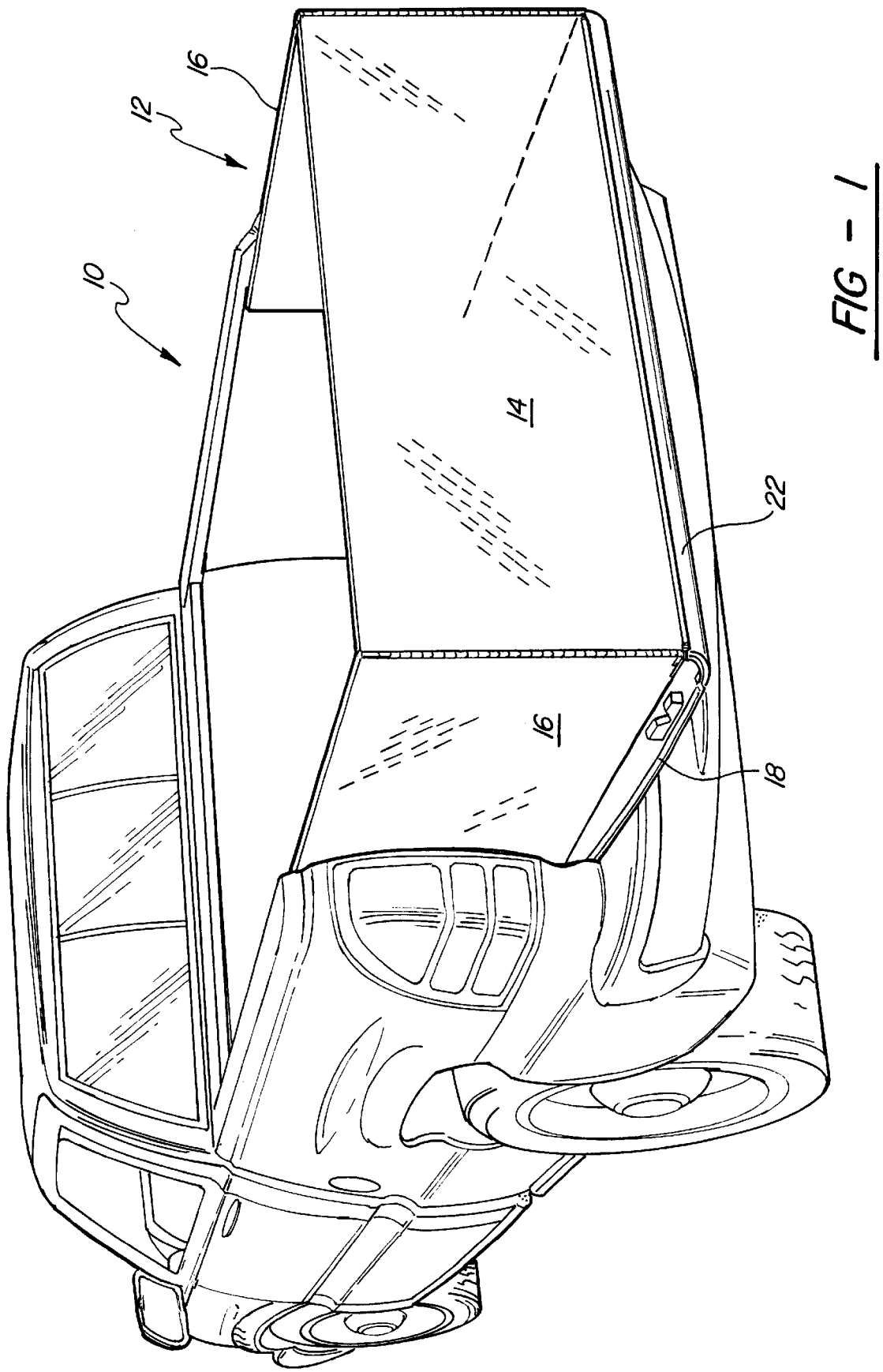
FIG. 1 is a rear perspective view of a pick-up truck having a bed extender installed thereon, shown in the deployed position.

Referring to FIG. 1, a pick-up truck 10 is shown, equipped with a cargo bed extender 12 according to the invention, shown in the deployed condition. The extender 12 includes a rear panel 14 and two side panels 16, each hinged to one side edge of the rear panel 14.

The rear panel 14 is hinged to the upper edge of the tailgate 18 of the truck 10 so as to be able to be swung up from a stowed position by lying against the inner surface of the tailgate 18 as shown in FIG. 3, to a vertical position shown with the tailgate 18 opened to lie in a horizontal position.

The side panels 16 are normally swung against the rear panel 14 when the extender is stowed, and swung out against the inside walls of the cargo bed to close off the gap between the raised rear panel 14 and the end 19 of the cargo bed in the manner described in the above referenced patents.

The side panels 16 may be secured to latching pins 20 used to latch the tailgate 18, or any other attachment as described in the referenced patents.

According to the improvement of the present invention, the rear panel 14 is attached to the top of the tailgate 18 by means of the replacement edge guard trim piece 22.

An original equipment edge guard trim piece 24 is installed in many truck models by the manufacturers, wrapping over upper edge of the tailgate 18.

Figure 4:
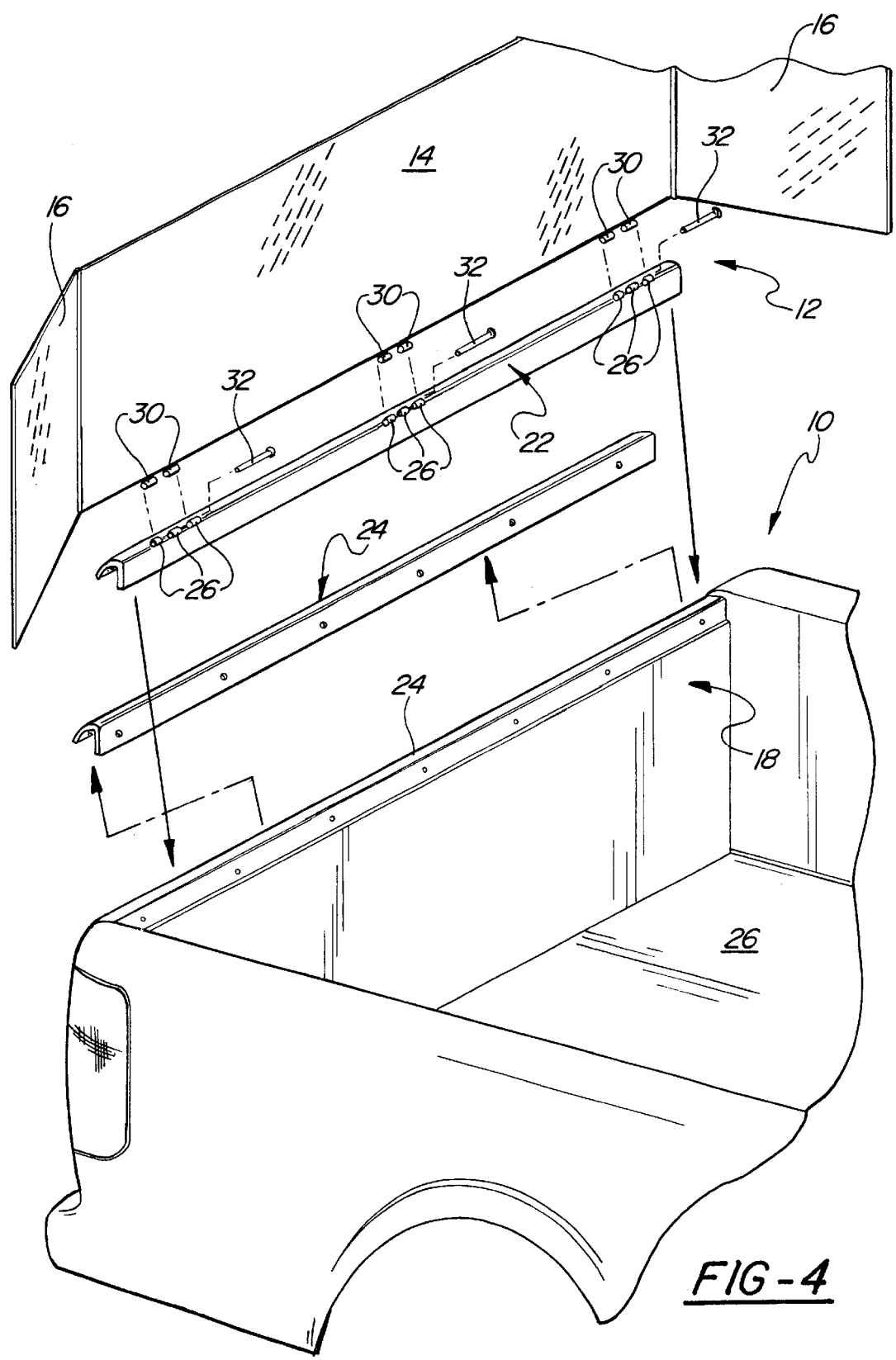
FIG. 4 is an exploded perspective view of the extender components and the original equipment trim piece replaced by one of the extender components.

The replacement edge guard 22 has integrally formed spaced sets of hinge ears 26 projecting towards the inside of the cargo bed 28 (FIG. 4).

The hinge ear sets 26 are interfit to aligned hinge ear sets 30 on the replacement guard edge 22.

Thus, to install the extender 12, the original equipment edge guard 24 is removed, and the replacement edge guard 22 installed. The hinge ear sets 30 of the rear panel 14 is then fit to the hinge ear sets and hinge pins 32 installed.

Thus, a simple installation is enabled which presents a finished appearance, and does not involve the installation of new screws other than those installed by the manufacturer as original equipment.

What is claimed is:

1. A method of installing a cargo bed extender on a cargo bed of a pick-up truck, said cargo bed including a tailgate adapted to be lowered to open said cargo bed, said tailgate having an original equipment edge guard trim piece attached atop said tailgate upper edge, said extender being of a type including a generally rectangular rear panel attached to said tailgate;

forming a replacement edge guard trim piece having the identical configuration as said original equipment edge guard trim piece except for having integral hinge features on the inside thereof;

forming said generally rectangular rear panel substantially corresponding to the height and width of said to be tailgate, and with integral hinging features able to be interfit with said trim piece hinge features to establish a hinged connection therebetween;

removing said original equipment edge guard trim piece and installing in its place said replacement edge guard trim piece by the same attachment as said original equipment trim piece;

installing said rear panel to said replacement trim piece by interfitting said respective hinge feature together to establish a hinged connection.

* * * * *